UNITED STATES PATENT OFFICE.

CARL EPLER, OF BOGORODSK, RUSSIA.

PROCESS OF TREATING AND REFINING COTTON-SEED-OIL RESIDUES.

1,094,430.     Specification of Letters Patent.     Patented Apr. 28, 1914.

No Drawing.     Application filed April 12, 1911. Serial No. 620,696.

*To all whom it may concern:*

Be it known that I, CARL EPLER, a subject of the Emperor of Russia, and a resident of Bogorodsk, Russia, have invented certain new and useful Improvements in the Process of Treating and Refining Cotton-Seed-Oil Residues.

Heretofore when pressing the seeds of the cotton plant for the purpose of obtaining oil, an oil of a dark color flows from the presses, which is refined to clarify it, i. e. it is purified by means of a weak solution of caustic sodium and by precipitation; with such refining of the oil a mucilage is obtained which is a black, thick, fatty mass having a very bad smell. Up to the present time this mucilage constituted a refuse which accumulates in very large quantities at the factory and was not used for anything. I have succeeded in converting this mucilage into an acid which is easily soapable and on the whole corresponds fully, in chemical composition and in quality, to oily acid and to other vegetable and animal fats. I have found that this result can be attained by the use of bleaching lime for bleaching the said mucilage and by treating the mass with sulfuric acid.

In carrying out my process I proceed as follows:

(1) A given quantity (12000 pounds for instance) of cotton residue (mucilage) is put into an ordinary iron boiler to which half of the quantity (6000 pounds) of a solution of 10% caustic sodium is added. The liquid is boiled with the aid of steam until a glue-like mass is obtained, after which 4% (480 pounds) of common salt (CLNa) is added, and the boiling is continued for a period of two hours. The inlet of steam is then stopped and the whole of the mucilage together with the alkali and salt is left to settle in the course of twelve hours.

(2) *Bleaching.*—The precipitated mass is pumped into a boiler covered inside with lead and provided with an air pipe for stirring the mass by blowing air into it. In this boiler two pounds of bleaching lime (calcium hypochlorite) is added for each 40 pounds of the mass, and after closing the boiler with a cover, the mass is boiled until it obtains the density of cream. The inlet of steam is then stopped, the air pump is started up and sulfuric acid of 60° Baumé is added (5 pounds of sulfuric acid to each 40 pounds of the mass). After stirring with air for a period of four hours, the air pump is stopped and the mass is left alone for 6 hours; the oily acid separates from the mass and floats to the top, while the lower layer forms a dirty sediment which, after it has settled, is removed from the boiler through a cock.

(3) *Washing.*—Steam and water are let into the boiler containing the oily acid and one-half pound of common salt is added for each 40 pounds of acid. The boiling is continued for two hours, after which the water is let out and the final washing being effected twice more with clean water.

(4) *Clarifying and drying.*—The washed oily acid is poured into an iron boiler provided with a closed heating serpentine and an air pipe for stirring. The oily acid obtained is heated in this boiler up to 100° C. and is stirred for a period of three hours; after this it is ready for use and may be poured into barrels or other receptacles.

What I claim is:

The hereindescribed process of refining and treating oily cotton seed residue (mucilage) which consists of the following steps: boiling the mucilage in a solution of caustic sodium with the addition of common salt and allowing the whole of the mucilage together with the alkali and salt to settle; bleaching the precipitated mass by boiling it with bleaching lime (calcium hypochlorite) and mixing it with sulfuric acid, stirring the mass and allowing it to stand until the oily acid separates; removing the dirty sediment; washing the acid obtained with steam and the addition of common salt; and finally clarifying and drying the washed oily acid by heating it up to 100° C. and stirring it.

In testimony whereof, I have signed my name to this specification in the presence of two subscribing witnesses.

CARL EPLER.

Witnesses:
   WOLF A. HERRMAN,
   MICHAEL SMEHTONTZKY.